US011686904B2

(12) United States Patent
Wang et al.

(10) Patent No.: US 11,686,904 B2
(45) Date of Patent: Jun. 27, 2023

(54) OPTICAL FIBER CONNECTOR AND CABLE ASSEMBLY AND OPTICAL FIBER CABLE CONNECTION SYSTEM

(71) Applicant: CommScope Technologies LLC, Hickory, NC (US)

(72) Inventors: Yousong Wang, Jiangsu (CN); Jin Liu, Jiangsu (CN); Yujun Zhang, Jiangsu (CN); Gangping Lei, Jiangsu (CN)

(73) Assignee: CommScope Technologies LLC, Hickory, NC (US)

( * ) Notice: Subject to any disclaimer, the term of this patent is extended or adjusted under 35 U.S.C. 154(b) by 32 days.

(21) Appl. No.: 17/341,587

(22) Filed: Jun. 8, 2021

(65) Prior Publication Data
US 2021/0396940 A1 Dec. 23, 2021

(30) Foreign Application Priority Data

Jun. 18, 2020 (CN) ......................... 202010557541.X

(51) Int. Cl.
*G02B 6/38* (2006.01)
(52) U.S. Cl.
CPC ......... *G02B 6/3887* (2013.01); *G02B 6/3857* (2013.01)
(58) Field of Classification Search
CPC .................................................. G02B 6/3887
See application file for complete search history.

(56) References Cited

U.S. PATENT DOCUMENTS

| 4,516,829 | A | * | 5/1985 | Borsuk | G02B 6/3869 385/78 |
| 4,708,428 | A | * | 11/1987 | Loeffler | G02B 6/3888 385/87 |
| 5,142,601 | A | * | 8/1992 | Shibata | G02B 6/3869 385/86 |
| 5,212,752 | A | * | 5/1993 | Stephenson | G02B 6/3843 385/139 |

(Continued)

OTHER PUBLICATIONS

"International Search Report and Written Opinion corresponding to International Application No. PCT/US2021/036077 dated Oct. 28, 2021".

*Primary Examiner* — Michael Stahl
(74) *Attorney, Agent, or Firm* — Myers Bigel, P.A.

(57) ABSTRACT

The disclosure relates to an optical fiber connector and cable assembly that includes an optical fiber cable and an optical fiber connector, wherein the optical fiber cable has an optical fiber and a cable sheath, and a free end of the optical fiber is provided with a ferrule, and the ferrule is associated with a ferrule spring. The optical fiber connector includes a connector body and a cover; a first fixing sleeve and a second fixing sleeve, between which the cable sheath is anchored; an insert mounted at a distal end of the first fixing sleeve, having a passage for receiving a proximal section of the ferrule and supporting the ferrule spring. In a direction facing a distal end of the connector body, the cover presses a first fixing sleeve, the first fixing sleeve presses the insert, the insert presses the ferrule spring, and the ferrule spring presses the ferrule. The disclosure also relates to an optical fiber cable connection system including two optical fiber connector and cable assemblies to be connected to each other. The optical fiber connector and cable assembly may have relatively simple structure, easy assembly and reliable operation.

19 Claims, 5 Drawing Sheets

(56) References Cited

U.S. PATENT DOCUMENTS

| | | |
|---|---|---|
| 9,841,566 B2 | 12/2017 | Nhep |
| 2009/0148104 A1* | 6/2009 | Lu .................... G02B 6/3821 |
| | | 385/72 |
| 2017/0205588 A1 | 7/2017 | Lee |
| 2019/0064447 A1 | 2/2019 | Chang et al. |
| 2019/0137694 A1 | 5/2019 | Murray |
| 2019/0219774 A1 | 7/2019 | Tamekuni et al. |
| 2020/0116937 A1 | 4/2020 | Nhep et al. |

* cited by examiner

OPTICAL FIBER CONNECTOR AND CABLE ASSEMBLY AND OPTICAL FIBER CABLE CONNECTION SYSTEM

RELATED APPLICATION

The present application claims priority from and the benefit of Chinese Patent Application No. 202010557541.X, filed Jun. 18, 2020, the disclosure of which is hereby incorporated herein by reference in full.

FIELD OF THE INVENTION

The present disclosure relates generally to optical fiber communication systems. More specifically, the present disclosure relates to an optical fiber connector applied in an optical fiber communication system.

BACKGROUND OF THE INVENTION

An optical fiber communication system may provide high-bandwidth communication capacity. The optical fiber communication system may include optical fiber cables for transmitting data. In an optical fiber communication system, an optical fiber connector is an important component. The optical fiber connector may connect two optical fiber cables to each other. With the development of 5G networks, optical fiber connectors may be applied for example in "fiber-to-the-antenna" (FTTA) systems. For example, the U.S. Pat. No. 9,841,566 B2 has disclosed an optical fiber connector.

SUMMARY OF INVENTION

An object of the present disclosure is to provide an optical fiber connector and cable assembly, which is simple in structure and easy to assemble.

The object may be achieved by an optical fiber connector and cable assembly, which includes an optical fiber cable and an optical fiber connector, wherein the optical fiber cable has an optical fiber and a cable sheath, a free end of the optical fiber being provided with a ferrule and the ferrule being associated with a ferrule spring. The optical fiber connector includes a connector body and a cover connected with a proximal section of the connector body, the cover and the proximal section of the connector body defining a proximal chamber; a first fixing sleeve placed onto the optical fiber cable and a second fixing sleeve placed onto the first fixing sleeve, wherein the cable sheath is anchored between the first fixing sleeve and the second fixing sleeve; an insert mounted at a distal end of the first fixing sleeve, having a passage for receiving a proximal section of the ferrule and supporting the ferrule spring; wherein the first fixing sleeve, the second fixing sleeve and the insert are received in the proximal chamber, wherein in a direction facing a distal end of the connector body, the cover presses the first or the second fixing sleeve, the first fixing sleeve presses the insert, the insert presses the ferrule spring, and the ferrule spring presses the ferrule.

The optical fiber connector and cable assembly may have less parts, may be easily assembled, and may work reliably.

In some embodiments, the connector body may have a proximal external thread, and the cover may have an internal thread that engages the external thread. In addition, it will also be appreciated that the connector body may be welded or bonded or fixed in any other manner to the cover.

In some embodiments, the first fixing sleeve, the second fixing sleeve, and the cable sheath may be crimped.

In some embodiments, the first fixing sleeve may have a shoulder, and the cover may press the shoulder.

In some embodiments, the cover may press a proximal end of the second fixing sleeve.

In some embodiments, the optical fiber cable may have at least two optical fibers that are surrounded by a common cable sheath. For example, the optical fiber cable may have two, four or more optical fibers. Furthermore, it will also be appreciated that the optical fiber cable may have exact one optical fiber.

In some embodiments, the optic fiber connector and cable assembly may have a receiving channel in which the ferrule and ferrule spring may be received.

In some embodiments, the optic fiber connector and cable assembly may include a housing member that may be received in the connector body, and the housing member has the receiving channel. The housing part can be injection molded, for example.

In some embodiments, the connector body may have the receiving channel.

In some embodiments, the connector body may have a distal chamber.

In some embodiments, the ferrule may extend from the receiving channel into the distal chamber.

In some embodiments, the optical fiber connector and cable assembly may have a positioning pin that non-rotationally connects at least one of the first fixing sleeve, the second fixing sleeve and the insert to the connector body.

In some embodiments, the positioning pin may additionally non-rotationally connect the housing member to the connector body.

In some embodiments, the distal chamber may have a positioning groove which extends axially and is configured for circumferential positioning of two fiber optic connector-cable assemblies to be connected to each other.

In some embodiments, the connector body may have a locking groove extending circumferentially in a distal outer peripheral surface thereof, and the locking groove is configured to detachably axially lock two optical fiber connector and cable assemblies to be connected to each other.

In some embodiments, the receiving channel may further receive a ferrule cap placed onto the ferrule, and the ferrule cap is configured to connect the ferrules of the two optical fiber connector and cable assemblies to be connected to each other.

In some embodiments, the connector body may have a positioning element on a distal outer peripheral surface thereof, and the positioning element is configured for circumferential positioning of two optical fiber connector and cable assemblies to be connected to each other.

In some embodiments, the optic fiber connector and cable assembly may have a locking device configured to detachably axially lock two fiber optic connector-cable assemblies to be connected to each other.

In some embodiments, the locking device may include:
a first locking sleeve fixedly mounted on the connector body, wherein a first annular space is defined between the first locking sleeve and the connector body:
an annular element received in the first annular space;
an inner spring received in the first annular space and biasing the annular element in the direction facing the distal end of the connector body;
a second locking sleeve placed onto the first locking sleeve and axially movable relative to the first locking sleeve, wherein a second annular space is defined between the second locking sleeve and the first locking sleeve;

an outer spring received in the second annular space and biasing the second locking sleeve in the direction facing the distal end of the connector body;

wherein the first locking sleeve has a through hole in which a locking ball is received, the annular element can radially support the locking ball in a region of the through hole under a pretension force of the internal spring, and the locking ball can be radially pressed and held in a locking position by the second locking sleeve under a pretension force of the external spring when the annular element moves away from the through hole, and the locking ball can be released from the locking position when the second locking sleeve is moved against the pretension force of the external spring.

Another aspect of the present disclosure relates to an optical fiber cable connection system that includes two optical fiber connector and cable assemblies, wherein a first of the optical fiber connector and cable assemblies has a first receiving channel, in which the ferrule and the ferrule spring of the first optical fiber connector and cable assembly are received, wherein the ferrule of the first optical fiber connector and cable assembly extends from the first receiving channel into a distal chamber of the connector body of the first optical fiber connector and cable assembly, wherein the other optical fiber connector and cable assembly has a second receiving channel receiving the ferrule, the ferrule spring and a ferrule cap of the other optical fiber connector and cable assembly, wherein a distal section of the connector body of the other optical fiber connector and cable assembly can be inserted into a distal section of the connector body of the first optical fiber connector and cable assembly, wherein the ferrule of the first optical fiber connector and cable assembly can be inserted into the ferrule cap of the other optical fiber connector and cable assembly, so that the ferrules of the two optical fiber connector and cable assemblies butt in the ferrule cap.

In some embodiments, the distal chamber of the first optic fiber connector and cable assembly may have a positioning groove extending axially, and the connector body of the other optic fiber connector and cable assembly may have a positioning element on the distal outer peripheral surface thereof, the positioning groove and the positioning element being configured for circumferential positioning of the two fiber optic connector-cable assemblies relative to each other.

In some embodiments, the connector body of the first optical fiber connector and cable assembly may have a locking groove extending circumferentially in the distal outer circumferential surface thereof, and the other optical fiber connector and cable assembly may have a locking device configured to detachably axially lock the two optical fiber connector and cable assemblies, wherein the locking device has a locking ball that can sink into the locking groove in a locking position and leave the locking groove in a releasing position.

The optical fiber connector and cable assemblies in the optical fiber cable connection system may have at least one of the foregoing features.

The foregoing features, the features to be mentioned later, and the features shown in the drawings may be arbitrarily combined with each other as long as they are not mutually contradictory. All technically feasible feature combinations are technical contents contained in the disclosure.

BRIEF DESCRIPTION OF DRAWINGS

The present invention will now be described in more detail by way of embodiments with reference to the accompanying drawings. Brief description of the drawings are as follow.

DETAILED DESCRIPTION OF THE EMBODIMENTS

Figure 1:
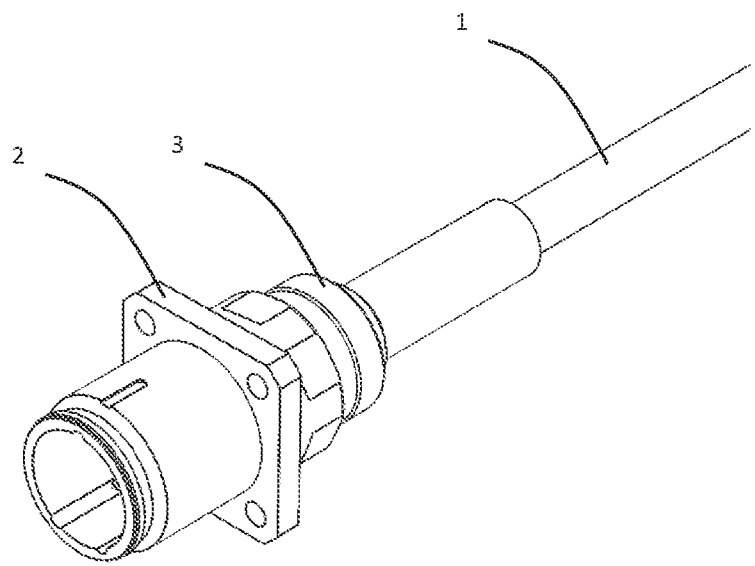
FIG. 1 is a perspective view of an optical fiber connector and cable assembly according to a first embodiment of the present invention.
Figure 2:
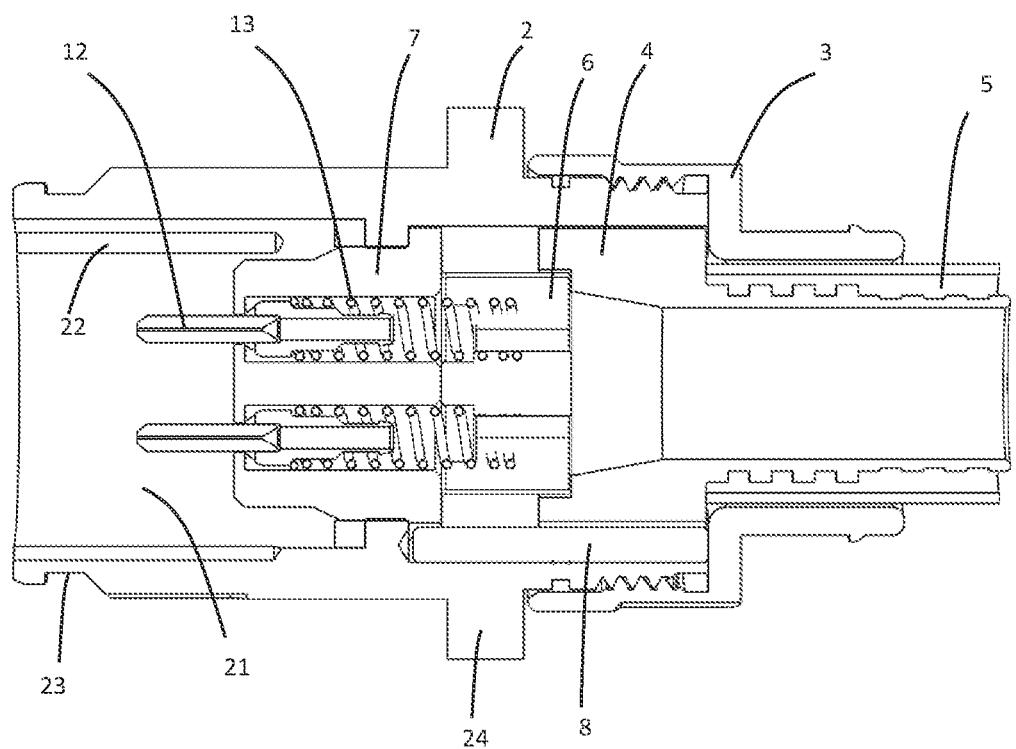
FIG. 2 is a longitudinal sectional view of the optic fiber connector and cable assembly of FIG. 1.
Figure 3:
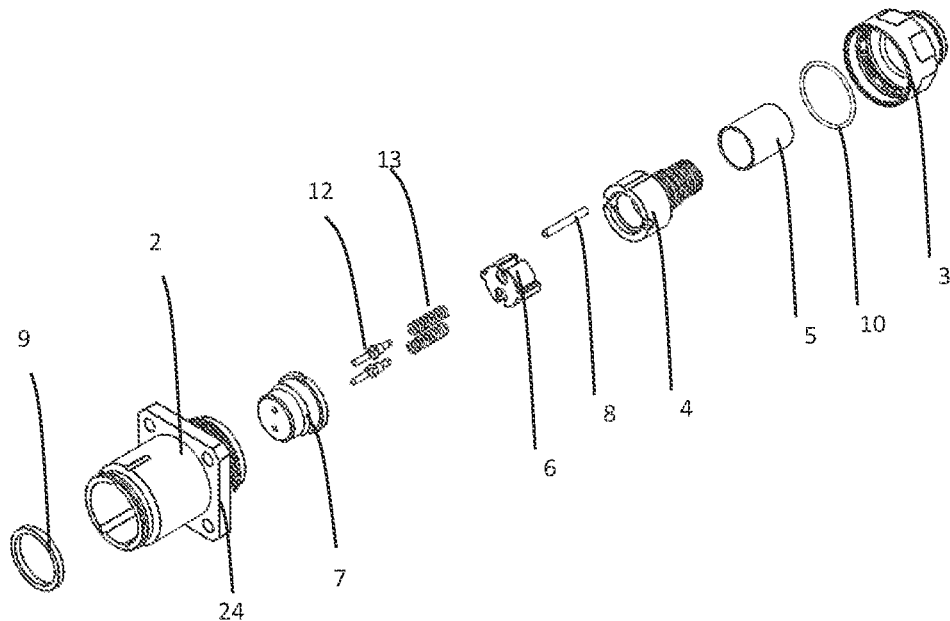
FIG. 3 is an exploded view of the optic fiber connector and cable assembly of FIG. 1.
Figure 4:
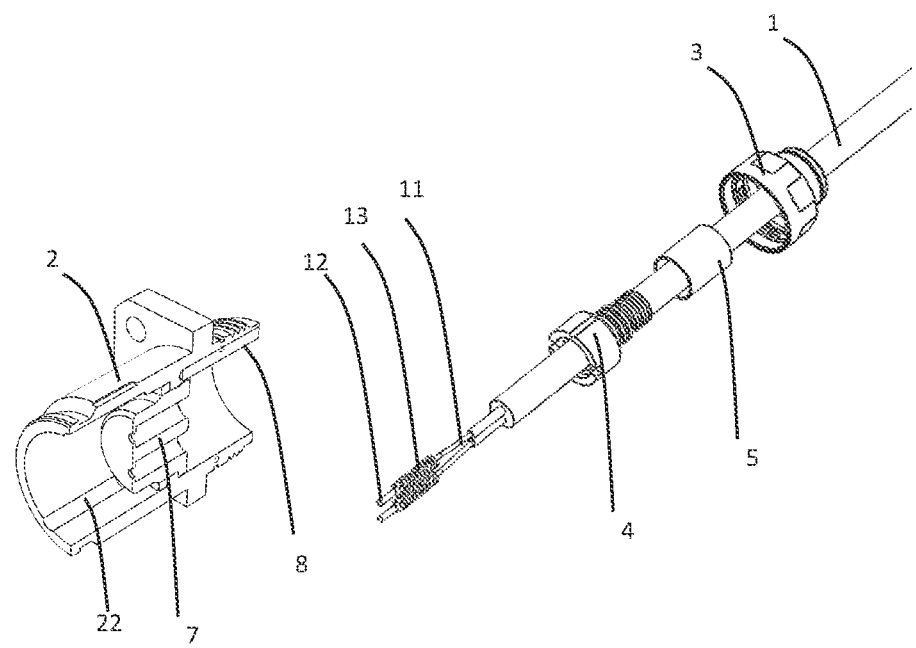
FIG. 4 is an exploded view for illustrating an assembly process of the optical fiber connector and cable assembly of FIG. 1.

First, an optical fiber connector and cable assembly according to a first embodiment of the present invention will be described with reference to FIGS. 1 to 4, wherein FIG. 1 is a perspective view of the optical fiber connector and cable assembly according to the first embodiment of the present invention, FIG. 2 is a longitudinal sectional view of the optical fiber connector and cable assembly of FIG. 1, FIG. 3 is an exploded view of the optical fiber connector and cable assembly of FIG. 1, and FIG. 4 is an exploded view for illustrating an assembly process of the optical fiber connector and cable assembly of FIG. 1. For simplicity, the optical fiber cable 1 is omitted from FIGS. 2 and 3.

The optical fiber connector and cable assembly comprises an optical fiber cable 1 and an optical fiber connector, wherein the optical fiber cable has optical fibers 11 and a cable sheath; free ends of the optical fibers are respectively provided with a ferrule 12; and the ferrule is associated with a ferrule spring 13. The optical fiber cable 1 may have any length. The optical fiber cable 1 may be provided with optical fiber connectors at both ends thereof, and each optical fiber connector may be used to connect two optical fiber cables. Only one of the end sections of the optical fiber cable 1 is illustrated in FIG. 1. The other end section of the optical fiber cable 1 may be provided with an identical optical fiber connector or a different optical fiber connector (e.g., an optical fiber connector of an optical fiber connector and cable assembly according to a second embodiment to be described below).

The optical fiber connector includes a connector body 2 and a cover 3 connected to a proximal section of the connector body. For example, the connector body 2 may have a proximal external thread, the cover may have an internal thread, and the internal thread may engage the external thread. The proximal section of the connector body 2 and the cover 3 may define a proximal chamber. A first fixing sleeve 4 placed onto the optical fiber cable 1, a second fixing sleeve 5 placed onto the first fixing sleeve 4, and an insert 6 are received in the proximal chamber. The cable sheath is anchored between the first fixing sleeve 4 and the second fixing sleeve 5. The cable sheath may include, for example, a tensile reinforcement layer made of a fabric such as aramid fibers and an outer sheath. At least one of the reinforcement layer and the outer sheath, in particular at least the reinforcement layer, may be anchored between the first fixing sleeve 4 and the second fixing sleeve 5. The anchoring can be achieved, for example, by crimping. The insert 6 is mounted at a distal end of the first fixing sleeve 4. The insert 6 may have radially extending ribs which may be inserted into notches of the first fixing sleeve 4 such that the insert 6 and the first fixing sleeve 4 are connected non-rotationally. The insert 6 may have passages that receive proximal sections of the ferrules 12. The insert 6 supports the ferrule springs 13.

In the shown embodiment, the optical fiber cable 1 has two optical fibers 11. Correspondingly, there are two ferrules 12 and two ferrule springs 13, and the insert 6 has two passages. However, it will also be appreciated that the number of optical fibers 11 of the optical fiber cable 1 may be arbitrary.

In an assembled state, in a direction facing the distal end of the connector body 2, the cover 3 can press a shoulder of the first fixing sleeve 4, the first fixing sleeve 4 can press the insert 6, the insert 6 can press the ferrule spring 13, and the ferrule spring 13 can press the ferrule 12.

The optical fiber connector and cable assembly may include a housing part 7 received in the connector body 2. To this end, the housing part 7 may have a shoulder, the connector body 2 may have a flange extending radially inward, and the shoulder of the housing part 7 may abut against the flange. The housing part 7 may have receiving channels, and each receiving channel may receive a ferrule 12 and an associated ferrule spring 13. The connector body 2 may have a distal chamber 21, into which the ferrules 12 may protrude from the receiving channels.

The optical fiber connector and cable assembly may have a positioning pin 8 that enables the first fixing sleeve 4 and the housing member 7 to be connected to the connector body 2 non-rotationally. When the cover 3 is screwed onto the connector body 2, the first fixing sleeve 4 and the housing part 7 and thus the second sleeve part 5 and the insert 6 cannot rotate relative to the connector body 2. Such rotation may be disadvantageous for the optical fiber cable 1.

The distal chamber 21 may have a positioning groove 22 extending axially, such as three positioning grooves 22 uniformly distributed in a circumferential direction, which is configured for circumferential positioning of two optical fiber connector and cable assemblies to be connected to each other, so that blind insertion of the two optical fiber connector and cable assemblies can be realized. The connector body 2 may have a locking groove 23 extending circumferentially in a distal outer peripheral surface thereof, and the locking groove is configured to detachably axially lock two optical fiber connector and cable assemblies to be connected to each other. The connector body 2 may have a flange 24 on its outer peripheral surface, which is configured for fixing the connector body 2 to a communication device.

FIG. 4 is an exploded view for illustrating an assembly process of the optical fiber connector and cable assembly of FIG. 1, wherein the connector body 2 and the housing member 7 are described in section. In a step of the assembly process, the positioning pin 8 may be first inserted into the connector body 2, and then the housing part 7 may be mounted into the connector body 2 from a proximal end of the connector body 2 along the positioning pin 8, until the housing part 7 is positioned at a predetermined axial position to position the housing part 7 in the axial and circumferential directions. In a step of the assembly process, if the optical fibers 11 have not been provided with the ferrules 12 and the ferrule springs 13, the ferrules 12 and the ferrule springs 13 may be mounted on the free ends of the optical fibers 11. In a step of the assembly process, the cover 3, the second fixing sleeve 5 and the first fixing sleeve 4 are sequentially placed onto the optical fiber cable 1. Next, the cable sheath of the optical fiber cable 1 is anchored between the first fixing sleeve 4 and the second fixing sleeve 5. The insert 6 is mounted to the distal end of the first fixing sleeve 4. Then, the optical fiber cable 1 together with the cover 3, the first fixing sleeve 4, the second fixing sleeve 5 and the insert 6 is mounted into the connector body 2 together with the housing part 7 and the positioning pin 8, wherein the positioning pin 8 positions the first fixing sleeve 4 in the circumferential direction. Finally, the cover 3 is connected to the connector body 2, for example, the cover 3 is screwed onto the connector body 2.

In order to liquid-tightly seal the optical fiber connector and cable assembly, the housing part 7 may be sealed with respect to the connector body 2 by a sealing element 9 (for example, an O-ring), and the cover 3 may be sealed with respect to the connector body 2 by a sealing element 10. The sealed optical fiber connector and cable assembly can be used in outdoor communication equipment.

Figure 5:
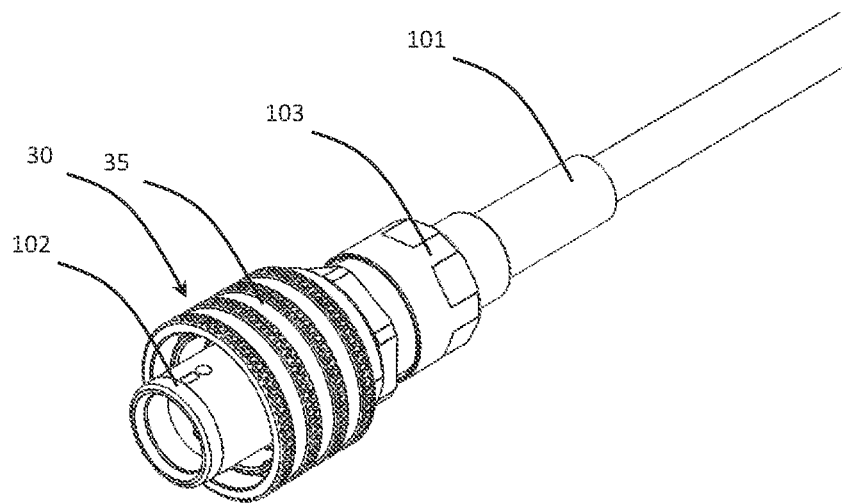
FIG. 5 is a perspective view of an optical fiber connector and cable assembly according to a second embodiment of the present invention.
Figure 6:
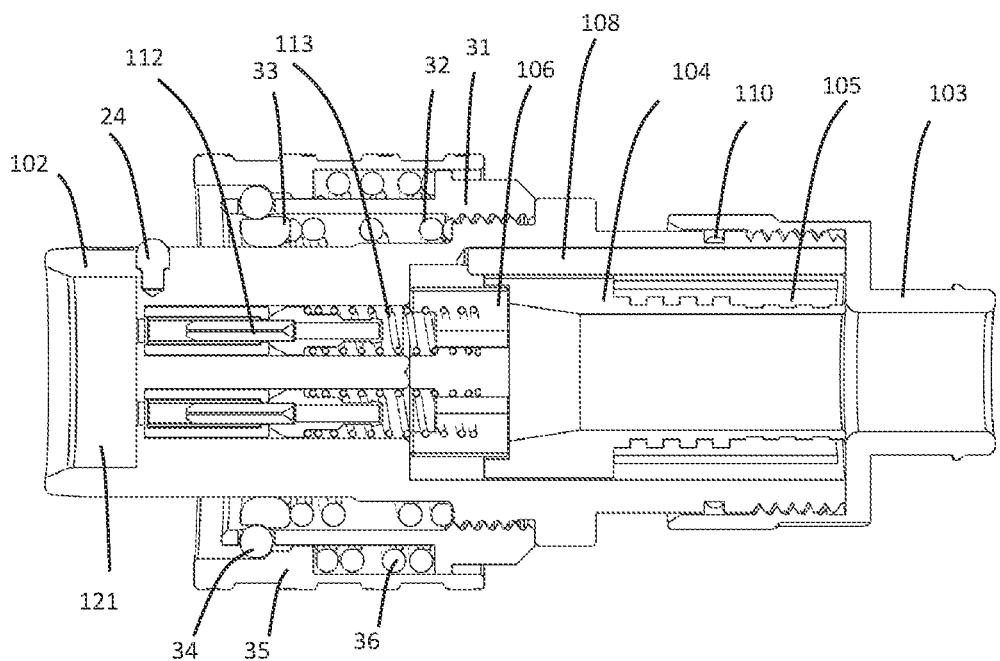
FIG. 6 is a longitudinal sectional view of the optic fiber connector and cable assembly of FIG. 5.
Figure 7:
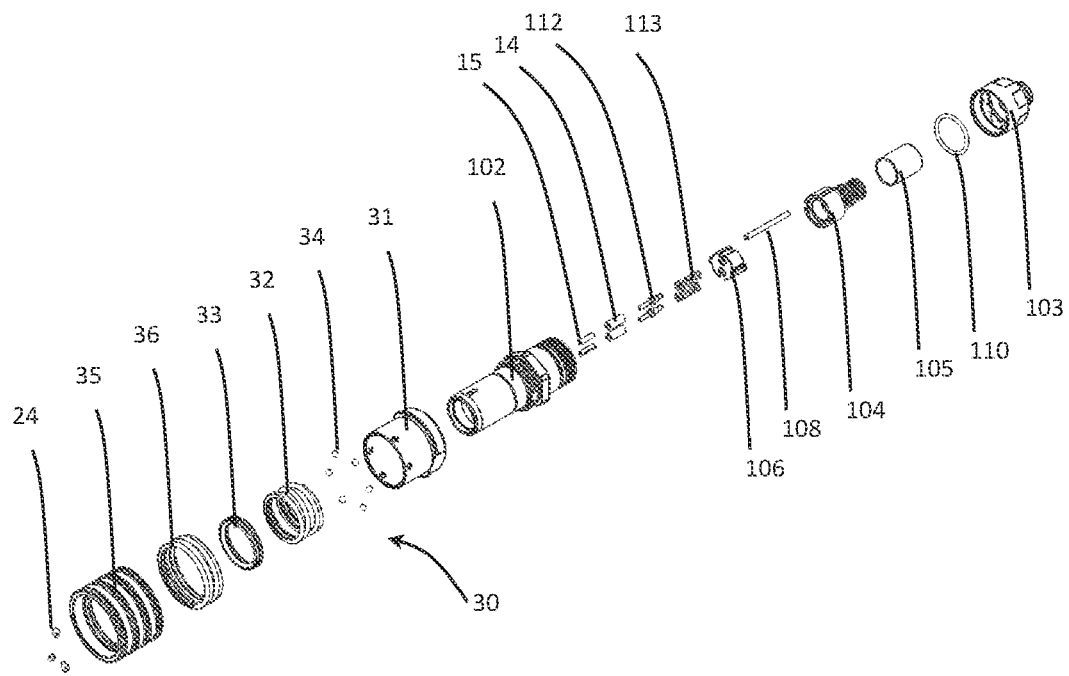
FIG. 7 is an exploded view of the optic fiber connector and cable assembly of FIG. 5.
Figure 8:
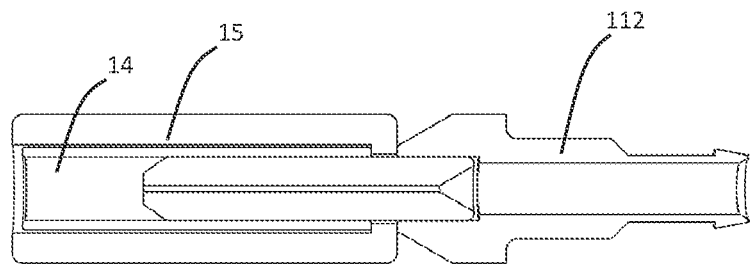
FIG. 8 is a longitudinal sectional view of components of the optic fiber connector and cable assembly of FIG. 5.

Next, an optical fiber connector and cable assembly according to a second embodiment of the present invention will be described with reference to FIGS. 5 to 8, wherein FIG. 5 is a perspective view of the optical fiber connector and cable assembly according to the second embodiment of the present invention, FIG. 6 is a longitudinal sectional view of the optical fiber connector and cable assembly of FIG. 5, FIG. 7 is an exploded view of the optical fiber connector and cable assembly of FIG. 5, and FIG. 8 is a longitudinal sectional view of the ferrule and the ferrule cap of the optical fiber connector and cable assembly of FIG. 5. Components in the second embodiment, which are identical or equivalent to those in the first embodiment, are represented by reference numerals increased by 100. For simplicity, the optical fiber cable 101 is omitted in FIGS. 6 to 8.

The optical fiber connector and cable assembly according to the second embodiment is similar to that according to the first embodiment. The main difference between them is explained below. In other aspects, references may be made to the description of the optical fiber connector and cable assembly according to the first embodiment.

In the second embodiment, the cover 3 can press the proximal end(s) of the first fixing sleeve 104 and/or second fixing sleeve 105, and then the first fixing sleeve 104 can press the insert 106, the insert 106 can press the ferrule spring 113, and the ferrule spring 113 can press the ferrule 112.

In the second embodiment, the separate housing part 7 as seen in FIGS. 2 to 4 is not provided. The connector body 102 has the receiving channels for receiving the ferrules 112 and the ferrule springs 113. In addition, the ferrule caps 15 are also received in the receiving channels. The ferrule caps may have a chamber in which a more precise sleeve 14 may be disposed. The ferrule 112 is inserted into the ferrule cap 15 or the sleeve 14. The ferrule 112 occupies a part of the length of the ferrule cap 15. The remaining length of the ferrule cap 15 is used to receive the ferrule 112 of the other mating optic fiber connector and cable assembly, such as the optic fiber connector and cable assembly according to the first embodiment. The positioning pin 108 may achieve the circumferential positioning of the first fixing sleeve relative to the connector body. The cover is also associated with a sealing member 110.

In the second embodiment, the connector body 102 may have a positioning element 24, for example, three positioning elements uniformly distributed in the circumferential direction on the distal outer circumferential surface thereof, and the positioning element may be configured for circumferential positioning of two optical fiber connector and cable assemblies to be connected to each other. The positioning element 24 can cooperate with the positioning groove 22 of the optical fiber connector and cable assembly according to the first embodiment. The positioning element may be an integral part of the connector body 102 or may be mounted to the connector body 102 as a separate component. The connector body 102 may also have a distal chamber 121.

In the second embodiment, the optical fiber connector and cable assembly may have a locking device 30 configured to detachably axially lock two optical fiber connector and cable assemblies to be connected to each other. The locking device may include a first locking sleeve 31 fixedly mounted on the connector body 102, wherein a first annular space is defined between the first locking sleeve and the connector body, an annular element 33 received in the first annular space; an internal spring 32 received in the first annular space and biasing the annular element 33 in the direction facing the distal end of the connector body; a second locking sleeve 35 placed onto the first locking sleeve and axially movable relative to the first locking sleeve, wherein a second annular space is defined between the second locking sleeve and the first locking sleeve; an outer spring 36 received in the second annular space and biasing the second locking sleeve in the direction facing the distal end of the connector body 102. The first locking sleeve 31 may have through holes in which locking balls 34 are received. The annular element 33 can radially support the locking balls 34 in the region of the through holes under the pre-tension force of the internal spring 32. When the annular element 33 moves away from the through hole, the locking balls 34 can be radially pressed and held in the locking position by the second locking sleeve 35 under the pre-tension force of the external spring 36. The locking balls 34 can be released from the locking position when the second locking sleeve 35 is moved against the pre-tension force of the external spring 36. In the shown embodiment, six through holes distributed evenly and six locking balls are provided. It will also be appreciated that the number of through holes and locking balls is exemplary.

In the embodiment shown in FIG. 8, the ferrule cap 15 may have a flange extending radially inward on one of the axial ends thereof, which is advantageous for keeping the sleeve 14 in the chamber of the ferrule cap 15. In an embodiment not shown, the ferrule cap 15 may have respective flanges extending radially inward on both axial ends thereof. The ferrule cap 15 may be integrally formed or constructed as a two-piece part.

Figure 9:
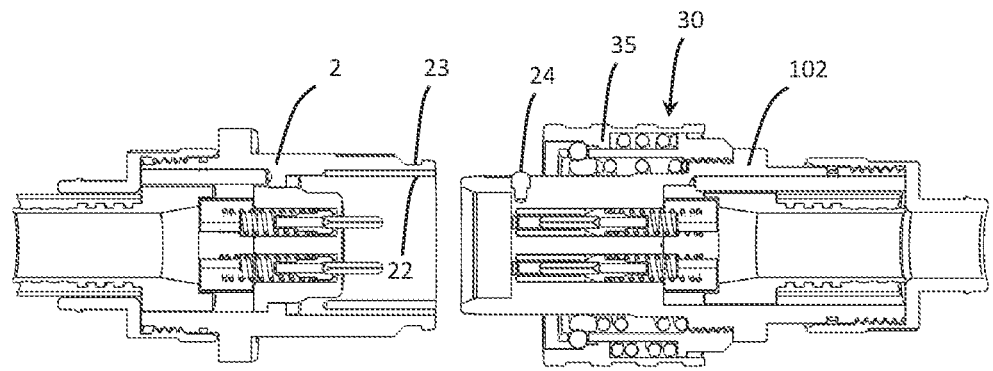
FIGS. 9 to 11 are longitudinal sectional views for illustrating a connection process of two optical fiber connector and cable assemblies.
Figure 10:
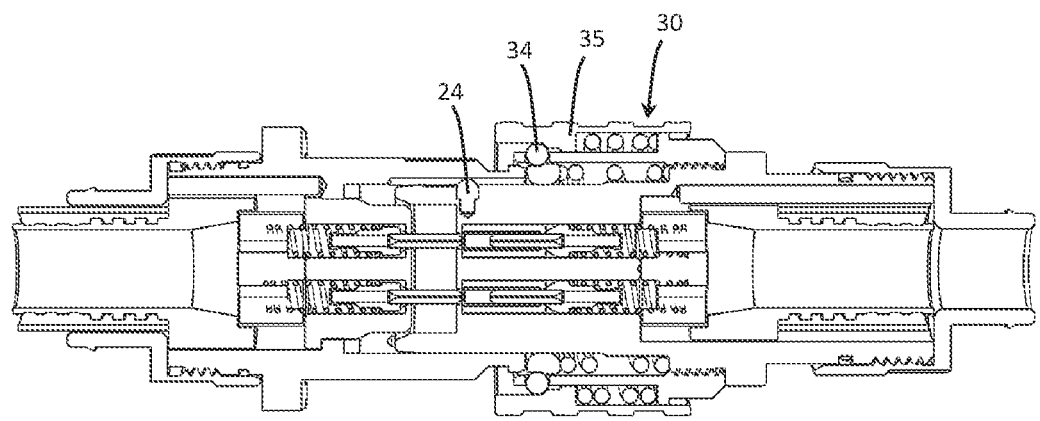
Figure 11:
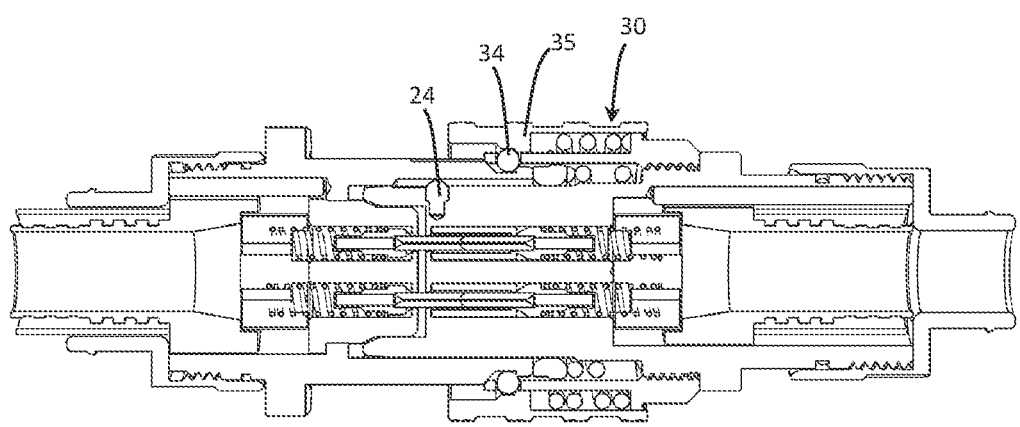

FIGS. 9 to 11 are longitudinal sectional views for illustrating a connection process of two optical fiber connector and cable assemblies, wherein one of the optical fiber connector and cable assemblies is constructed according to the first embodiment and the other optical fiber connector and cable assembly is constructed according to the second embodiment. In the state shown in FIG. 9, the two fiber optic connector-cable assemblies are close to each other. The circumferential position of the two fiber optic connector-cable assemblies facing each other can be determined by the positioning groove 22 and the positioning element 24. In the state shown in FIG. 10, compared with the state shown in FIG. 9, the two optical fiber connector and cable assemblies are inserted into each other for mating, wherein the first optical fiber connector and cable assembly abuts with its distal end against the annular member 33 of the other optical fiber connector and cable assembly. In the state shown in FIG. 11, compared with the state shown in FIG. 10, the two optical fiber connector and cable assemblies are further inserted into each other, wherein the first optical fiber connector and cable assembly pushes the annular element 33 of the other optical fiber connector and cable assembly with its distal end away from the locking balls 24, which are pressed into and held in the locking grooves 23 of the first optical fiber connector and cable assembly by the second locking sleeve 35 under the action of the external spring 36, so that the two optical fiber connector and cable assemblies are locked in the connected state, wherein the ferrules 12 of the two optical fiber connector and cable assemblies are butted against each other in the ferrule caps 15. If the connection of the two optical fiber connector and cable assemblies should be loosened, the second locking sleeve 35 can be pushed against the force of the external spring 36, so that the locking balls 24 are released, and then the first optical fiber connector and cable assembly can be pulled out.

Here, the optical fiber connector of the first optical fiber connector and cable assembly may be referred to as a female connector, and the optical fiber connector of the other optical fiber connector and cable assembly may be referred to as a male connector.

It will be understood that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.).

Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

What is claimed is:

1. An optical fiber connector and cable assembly including an optical fiber cable and an optical fiber connector, the optical fiber cable having an optical fiber and a cable sheath, a free end of the optical fiber being provided with a ferrule, the ferrule being associated with a ferrule spring, wherein the optical fiber connector comprises:
    a connector body and a cover connected to a proximal section of the connector body, the cover and the proximal section of the connector body defining a proximal chamber;
    a first fixing sleeve placed onto the optical fiber cable and a second fixing sleeve placed onto the first fixing sleeve; and
    an insert directly connected to a distal end of the first fixing sleeve having a passage for receiving a proximal section of the ferrule and supporting the ferrule spring;
    wherein the first fixing sleeve, the second fixing sleeve and the insert are received in the proximal chamber, and
    wherein, in a direction facing a distal end of the connector body, the cover presses the first or the second fixing sleeve, the first fixing sleeve presses the insert, the insert presses the ferrule spring, and the ferrule spring presses the ferrule.

2. The optic fiber connector and cable assembly as recited in claim 1, wherein the connector body has a proximal external thread, the cover has an internal thread, and the internal thread engages the external thread.

3. The optical fiber connector and cable assembly as recited in claim 1, wherein the first fixing sleeve, the second fixing sleeve and the cable sheath are crimped.

4. The optic fiber connector and cable assembly as recited in claim 1, wherein the first fixing sleeve has a shoulder, and the cover presses the shoulder.

5. The optic fiber connector and cable assembly as recited in claim 1, wherein the optic fiber connector and cable assembly has a receiving channel in which the ferrule and the ferrule spring are received.

6. The optic fiber connector and cable assembly as recited in claim 5, wherein the optic fiber connector and cable assembly includes a housing member received in the connector body, and the housing member has the receiving channel; or the connector body has the receiving channel.

7. The optic fiber connector and cable assembly as recited in claim 1, wherein the connector body has a distal chamber.

8. The optic fiber connector and cable assembly as recited in claim 5, wherein the connector body has a distal chamber, and the ferrule protrudes from the receiving channel into the distal chamber.

9. The optical fiber connector and cable assembly as recited in claim 1, wherein the optical fiber connector and cable assembly has a positioning pin that connects at least one of the first fixing sleeve, the second fixing sleeve and the insert to the connector body non-rotationally.

10. The optical fiber connector and cable assembly as recited in claim 6, wherein the optical fiber connector and cable assembly has a positioning pin that connects the housing member and at least one of the first fixing sleeve, the second fixing sleeve and the insert to the connector body non-rotationally.

11. The optic fiber connector and cable assembly as recited in claim 7, wherein the distal chamber has a positioning groove extending axially and configured for circumferential positioning of two fiber optic connector-cable assemblies to be connected to each other.

12. The optical fiber connector and cable assembly as recited in claim 1, wherein the connector body has a locking groove extending circumferentially in a distal outer peripheral surface thereof, the locking groove being configured to detachably axially lock two optical fiber connector and cable assemblies to be connected to each other.

13. The optical fiber connector and cable assembly as recited in claim 5, wherein the receiving channel further receives a ferrule cap, the ferrule cap is placed onto the ferrule, and the ferrule cap is configured to butt the ferrules of two optical fiber connector and cable assemblies to be connected to each other.

14. An optical fiber cable connection system that includes two optical fiber connector and cable assemblies as recited in claim 1,
    wherein a first of the optical fiber connector and cable assemblies has a first receiving channel, in which the ferrule and the ferrule spring of the first optical fiber connector and cable assembly are received, wherein the ferrule of the first optical fiber connector and cable assembly extends from the first receiving channel into a distal chamber of the connector body of the first optical fiber connector and cable assembly,
    wherein the other optical fiber connector and cable assembly has a second receiving channel receiving the ferrule, the ferrule spring and a ferrule cap of the other optical fiber connector and cable assembly
    wherein a distal section of the connector body of the other optical fiber connector and cable assembly can be inserted into a distal section of the connector body of the first optical fiber connector and cable assembly, wherein the ferrule of the first optical fiber connector and cable assembly can be inserted into the ferrule cap of the other optical fiber connector and cable assembly, so that the ferrules of the two optical fiber connector and cable assemblies butt in the ferrule cap.

15. The optical fiber cable connection system as recited in claim 14, wherein the distal chamber of the first optical fiber connector and cable assembly has a positioning groove extending axially, and the connector body of the other optical fiber connector and cable assembly has a positioning element on a distal outer peripheral surface thereof, the positioning groove and the positioning element being configured for circumferential positioning of the two optical fiber connector and cable assemblies relative to each other.

16. The optical fiber cable connection system as recited in claim 14, wherein the connector body of the first optical fiber connector and cable assembly has a locking groove extending circumferentially in a distal outer peripheral surface thereof, and the other optical fiber connector and cable assembly has a locking device configured to detachably axially lock the two optical fiber connector and cable assemblies, and wherein the locking device has a locking ball that can sink into the locking groove in a locking position and leave away the locking groove in a releasing position.

17. An optical fiber connector and cable assembly including an optical fiber cable and an optical fiber connector, the optical fiber cable having an optical fiber and a sheath, a free end of the optical fiber being provided with a ferrule, the ferrule being associated with a ferrule spring, wherein the optical fiber connector comprises:
- a connector body and a cover connected to a proximal section of the connector body, the cover and the proximal section of the connector body defining a proximal chamber;
- a first fixing sleeve placed onto the optical fiber cable and a second fixing sleeve placed onto the first fixing sleeve; and
- an insert mounted at a distal end of the first fixing sleeve having a passage for receiving a proximal section of the ferrule and supporting the ferrule spring;
- wherein the first fixing sleeve, the second fixing sleeve and the insert are received in the proximal chamber,
- wherein, in a direction facing a distal end of the connector body, the cover presses the first or the second fixing sleeve, the first fixing sleeve presses the insert, the insert presses the ferrule spring, and the ferrule spring presses the ferrule, and
- wherein the optic fiber connector and cable assembly has a locking device configured to detachably axially lock two fiber optic connector-cable assemblies to be connected to each other.

18. The optical fiber connector and cable assembly as recited in claim 17, wherein the locking device includes:
- a first locking sleeve fixedly mounted on the connector body, wherein a first annular space is defined between the first locking sleeve and the connector body;
- an annular element received in the first annular space;
- an internal spring received in the first annular space and biasing the annular element in the direction facing the distal end of the connector body;
- a second locking sleeve placed onto the first locking sleeve and axially movable relative to the first locking sleeve, wherein a second annular space is defined between the second locking sleeve and the first locking sleeve;
- an outer spring received in the second annular space and biasing the second locking sleeve in the direction facing the distal end of the connector body;
- wherein the first locking sleeve has a through hole, a locking ball is received in the through hole, the annular element can radially support the locking ball in a region of the through hole under a pretension force of the internal spring, and the locking ball can be radially pressed and held in a locking position by the second locking sleeve under a pretension force of the external spring when the annular element moves away from the through hole, and the locking ball can be released from the locking position when the second locking sleeve is moved against the pretension force of the external spring.

19. An optical fiber connector and cable assembly including an optical fiber cable and an optical fiber connector, the optical fiber cable having an optical fiber and a cable sheath, a free end of the optical fiber being provided with a ferrule, the ferrule being associated with a ferrule spring, wherein the optical fiber connector comprises:
- a connector body and a cover connected to a proximal section of the connector body, the cover and the proximal section of the connector body defining a proximal chamber;
- a first fixing sleeve placed onto the optical fiber cable and a second fixing sleeve placed onto the first fixing sleeve; and
- an insert mounted at a distal end of the first fixing sleeve having a passage for receiving a proximal section of the ferrule and supporting the ferrule spring;
- wherein the first fixing sleeve, the second fixing sleeve and the insert are received in the proximal chamber,
- wherein, in a direction facing a distal end of the connector body, the cover presses the first or the second fixing sleeve, the first fixing sleeve presses the insert, the insert presses the ferrule spring, and the ferrule spring presses the ferrule, and
- wherein the connector body has a positioning element on a distal outer peripheral surface thereof, which is configured for circumferential positioning of two optical fiber connector and cable assemblies to be connected to each other.

* * * * *